Figure 1:
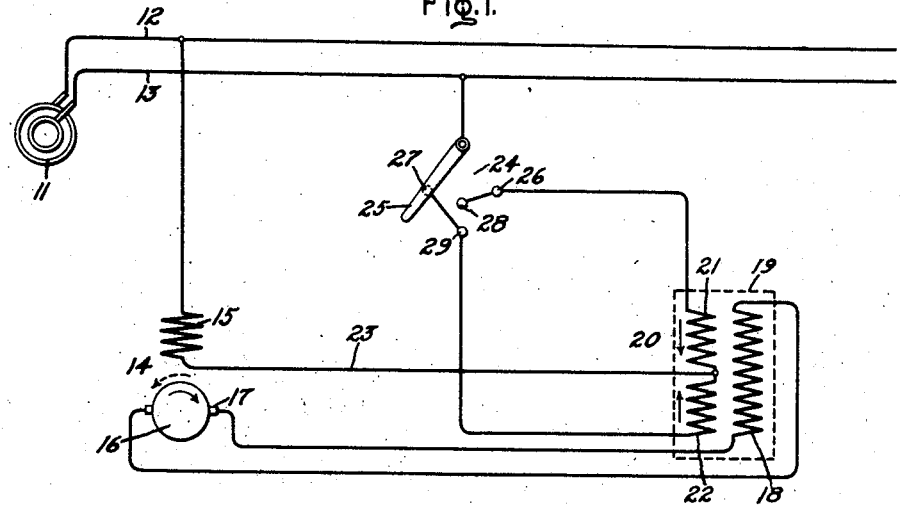

C. W. SHAIFER.
ALTERNATING CURRENT COMMUTATOR MOTOR.
APPLICATION FILED MAY 24, 1920.

1,434,755.

Patented Nov. 7, 1922.

Inventor:
Charles W. Shaifer,
by Albert G. Davis
His Attorney.

Patented Nov. 7, 1922.

1,434,755

UNITED STATES PATENT OFFICE.

CHARLES W. SHAIFER, OF SCHENECTADY, NEW YORK, ASSIGNOR TO GENERAL ELECTRIC COMPANY, A CORPORATION OF NEW YORK.

ALTERNATING-CURRENT COMMUTATOR MOTOR.

Application filed May 24, 1920. Serial No. 383,638.

*To all whom it may concern:*

Be it known that I, CHARLES W. SHAIFER, a citizen of the United States, residing at Schenectady, county of Schenectady, State of New York, have invented certain new and useful Improvements in Alternating-Current Commutator Motors, of which the following is a specification.

My invention relates to alternating current motors, and more particularly to commutator motors.

One of the objects of my invention is to make it possible to bring such a motor to rest and to reverse it in a relatively short period of time. This is especially important for motors, generally termed "pilot motors," used for instance for the operation of rheostats, valves, and such apparatus. With motors of this class it is extremely important that the motor be dead beat; that is, that the motor should come to a dead stop as soon as the movement which it is to perform has been accomplished. Other objects and advantages of my invention will be apparent as the description proceeds.

It has been quite customary for bringing alternating current commutator motors to rest by braking them dynamically; that is, to allow the armature circuit of the motor to supply energy due to its rotation to a translating device. Very often the circuits are so arranged that the motor returns power to the mains, but such regenerative effect is attained only at the expense of rather complicated apparatus not generally applicable to the small sizes of motors used for the operation of the apparatus mentioned hereinbefore. With the aid of my invention it is possible to bring the motor to a standstill in a very short period of time. As is well known, the alternating current single phase commutator motor operates on substantially the same principle as an ordinary direct current motor. One phenomenon, however, that must be considered with respect to an alternating current motor is that of phase relation, since in order to secure an efficient motor it is necessary that the flux produced by the field winding be substantially in phase with the armature current. When the armature and the field winding are in series, this condition is obtained and the motor operates efficiently. It is also possible to operate such a motor by a shunt connection of the field and armature, but in such a case it is necessary either to design the motor so that the proper phase relations are inherently produced or else to supply phase modifying means in either the armature or the field circuit. My invention is applicable to a great many varieties of the commutator motor, but for the sake of illustration I show my invention applied to the classes of motors adapted to operate in the manner described in general terms hereinbefore.

Expressed in its broadest terms, my invention comprises the use of a translating device connected across the commuted winding of the motor which is usually termed the armature. This translating device as arranged performs a plurality of functions. Under one set of conditions it will transfer energy from an alternating current source to the commuted winding so as to cause the motor to rotate in one direction, while in another set of conditions there is no supply of energy whatsoever to the commuted winding, but instead the translating device operates solely as a recipient of the energy derived from the movement of the commuted winding in the field of the motor; while under still another set of conditions the translating device operates again to transfer energy from the source to the commuted winding but now in such a way as to cause the motor to rotate in the opposite direction. During the time that the translating device acts as the recipient of energy from the commuted winding of the motor, the motor is as is well understood operating as a generator and is brought to a standstill in an inappreciable period of time. The translating device above described may appropriately be in the form of a transformer, the secondary of which is connected to the commuted winding, while the primary coils are so arranged that they may be switched into the circuit either to transfer energy in one direction or the other, or to transfer no energy at all. It is a simple proposition to set up the apparatus with the requisite switching to perform these functions. The primary coils of the transformer may be so arranged that when the motor is being operated as a generator to brake it dynamically, these primary windings produce as a whole no magnetic flux; that is, the primary windings are so arranged that the number of ampere turns therethrough, when taking into consideration algebraic signs, reduces to zero.

Figure 2:
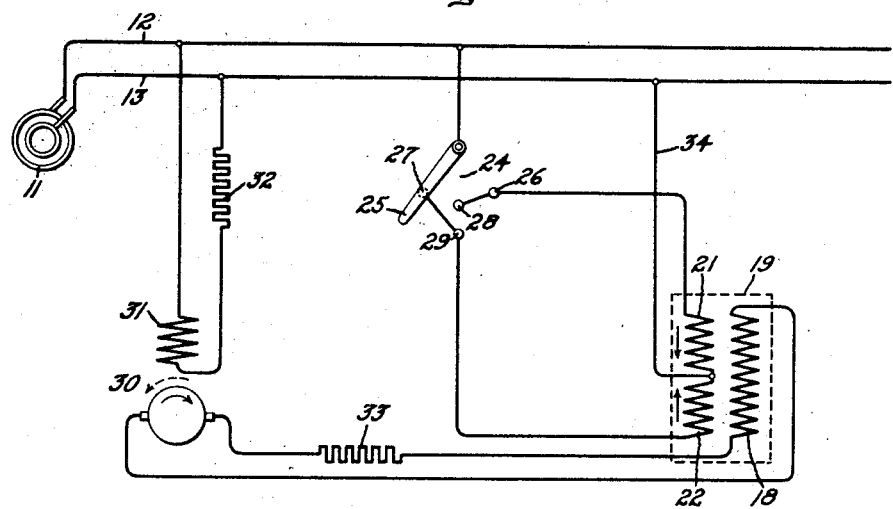

The construction and mode of operation of my invention may be understood from a consideration of the following description taken in connection with the accompanying drawings, in which Fig. 1 shows the wiring diagram for a commutator motor operating substantially as an ordinary series motor; and Fig. 2 is a modification showing the principle of my invention applied to a motor operating as a shunt motor.

Referring now more in detail to the drawings, in which like reference characters refer to like parts throughout, the alternator 11 is shown as the source of alternating current supplying power through mains 12 and 13. In the modifications shown in Fig. 1, the motor designated by the reference character 14 has a stationary field winding 15 having one terminal connected to main 12, and adapted to coact with the commuted winding or armature 16, which is appropriately provided with brushes 17. The entire arrangement is illustrated diagrammatically since the construction of such a motor is well understood. The commuted winding or armature 16 is adapted at times to be supplied with energy from the secondary 18 of a transformer 19. The primary 20 of this transformer 19 is connected in circuit with the field winding 15. This primary winding 20 is shown as comprising two oppositely wound portions 21 and 22. The wire 23 leading from the other terminal of the field winding 15 connects between these two opposed windings. It is evident that if some form of switch be now provided whereby either one or the other windings 21 and 22 be placed in series with the winding 15 across the mains 12 and 13, the motor 14 will rotate either in one direction or the other depending upon which one of these windings is placed in series with the field winding 15. For the purpose of effecting this selective act I employ switching means diagrammatically illustrated at 24. This switching means as shown comprises a manually operable blade 25 connected to the main 13. The primary windings 21 and 22 have free terminals 26 and 27 respectively, which are placed in the path of the switch blade 25 and so arranged that as the switch blade is rotated it makes contact with one or the other of these terminals. When contact is made with the terminal 27 then, as is readily seen, the primary winding 22 is energized and the motor rotates in a certain direction. Should the blade 25 however be in contact with the contact 26, then the primary winding 21 is energized and the motor will rotate in the opposite direction since the direction of the E. M. F. applied to the armature winding thereof has been reversed. Intermediate the two contacts 26 and 27 are located two other contacts 28 and 29 arranged to be bridged simultaneously by the switch blade 25. These contacts are connected, one to contact 26, and the other to contact 27. When the blade 25 in its movement from right to left or left to right connects with contacts 28 and 29, both of the primary windings 21 and 22 are energized and are in parallel, this parallel arrangement as a whole being in series with the field winding 15. Under such circumstances the secondary E. M. F. of the transformer 19 drops to zero and this transformer merely acts as a translating device receiving energy from the armature 16 of the motor which then acts as a generator, during the period when its inertia acts to keep it rotating.

The mode of operation of the entire apparatus is clear from the foregoing description. As a summary, when the switch blade is in a position shown in Fig. 1 the armature 16 is supplied with energy from the secondary winding 18 and is caused to rotate say in the direction shown by the full arrow. If it is desired to reverse the motor quickly, the switch blade 25 is swung to the right and held momentarily where it connects to contacts 28 and 29. Under such conditions there is dynamic braking of the machine. As soon as it stops, the blade 25 is swung to the extreme right-hand position and connects with contact 26. Under such circumstances the armature 16 will rotate in a direction shown by the dotted arrow opposite to the original direction. The motor operates substantially as a series motor since the primary winding of the transformer 19 is in series with the field winding 15. Such a mode of operation, however, is not essential to my invention, which may be applied to other forms of commutator motors. One of the other forms that may be utilized is shown in Fig. 2.

In this figure the commutator motor 30 operates substantially as a shunt motor. The field winding 31 is connected across the mains 12 and 13. A resistance 32 may be inserted for regulating the field excitation. In this case, as in the first form, I show a transformer 19 having a secondary winding 18 and opposed primary windings 21 and 22. I show a resistance 33 in series with the armature circuit for the purpose of regulating the phase relation, in case the armature circuit has not sufficient resistance. However, the connection 23 in Fig. 1 is replaced by the connection 34 which connects with the main 13. It is apparent that with this connection the primary windings 21 and 22 are energized directly from the mains. When the switch blade 25 is in the position shown, the motor will rotate say in the direction shown by the full arrow. When the blade is in the vertical position, so that it contacts with contacts 28 and 29, opposed windings 21 and 22 are both energized in parallel and the secondary winding 18 has an induced E. M. F. substantially equal to zero. Upon the extreme movement to the right of switch blade 25 the direction of rotation of the motor is reversed and it will rotate now in the direction shown by the dotted arrow.

It is seen from the foregoing description that the method of operating and reversing alternating current commutating motors may be most efficiently performed by means of my invention. Although this type of operation finds its greatest utility for small pilot motors, the invention is not limited to that form but may be applied to any form of alternating current commutator motor.

Furthermore, while I have shown in the accompanying drawings the preferred embodiment of my invention, I do not desire to limit myself thereto, but aim to cover in the appended claims all modifications falling fairly within the scope of my invention.

What I claim as new and desire to secure by Letters Patent of the United States, is,—

1. In combination, an alternating current motor having a commuted winding, a transformer having a pair of opposed primary windings, and a secondary winding connected to said commuted winding, and means whereby either or both of the opposed primary windings may be energized.

2. In combination, an alternating current motor having a commuted winding, a translating device connected to said winding, and means adapted to control the direction of rotation of said motor for causing said device to transmit energy to said commuted winding from an alternating current source, to cause the motor to rotate, and for causing said device to receive energy from said commuted winding when it is desired to brake the motor.

3. In combination, an alternating current motor having a commuted winding, a translating device connected to said winding, and means adapted to control the direction of rotation of said motor for causing said translating device to act solely as a source of energy for supplying said winding or to act solely as a recipient of energy from said winding.

4. In combination, an alternating current motor having a commuted winding, a stationary device connected to said commuted winding, and adapted to transfer energy thereto from an alternating current source, and a switch adapted to control the direction of rotation of said motor for altering the conditions of said stationary device so that it may act as a recipient of energy from the commuted winding and brake the motor.

5. In combination, an alternating current motor having a commuted winding, a transformer supplied from an alternating current source connected to said commuted winding, and means for dynamically braking and reversing the motor comprising a switch, and connections from the transformer to said switch, so arranged that by movement of said switch the induced E. M. F. of the transformer is reduced substantially to zero without disconnecting it from the source, and by a further movement the induced E. M. F. is reversed.

6. In combination, an alternating current motor having a commuted winding, a transformer supplied from an alternating current source having a pair of opposed primary windings and a secondary winding connected to said commuted winding, a switch, and connections from the opposed windings to said switch whereby a continued movement of the switch causes first one of the primary windings to be energized, then both of said windings, and finally the other of said windings.

7. In combination, an alternating current motor adapted to be operated from a source of alternating current and having a commuted armature winding and a field winding, a transformer having a pair of opposed series connected primary windings, one of the field winding terminals being connected to one of the mains of the source, the other terminal being connected between the opposed primary windings, said armature winding being connected to the secondary of the transformer, a switch connected to the other main of the source, and connections from the free terminals of the two opposed primary windings to contacts in the path of said switch so arranged that as the switch is moved it makes contact first with one of the primary terminals, then with both, and later with the other of the primary terminals. whereby either one or both of said opposed windings may be energized to start, brake and reverse said motor as needed.

In witness whereof, I have hereunto set my hand this 22nd day of May, 1920.

CHARLES W. SHAIFER.